US012532000B2

United States Patent
Lv et al.

(10) Patent No.: US 12,532,000 B2
(45) Date of Patent: Jan. 20, 2026

(54) INTER-FRAME PREDICTION METHOD AND TERMINAL

(71) Applicant: VIVO MOBILE COMMUNICATION CO., LTD., Guangdong (CN)

(72) Inventors: Zhuoyi Lv, Guangdong (CN); Chuan Zhou, Guangdong (CN); Jinrong Zhang, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 0 days.

(21) Appl. No.: 18/915,266

(22) Filed: Oct. 14, 2024

(65) Prior Publication Data
US 2025/0039405 A1 Jan. 30, 2025

Related U.S. Application Data

(63) Continuation of application No. PCT/CN2023/088030, filed on Apr. 13, 2023.

(30) Foreign Application Priority Data

Apr. 15, 2022 (CN) .......................... 202210400128.1

(51) Int. Cl.
*H04N 7/12* (2006.01)
*H04N 19/159* (2014.01)
*H04N 19/167* (2014.01)
*H04N 19/176* (2014.01)

(52) U.S. Cl.
CPC ......... *H04N 19/159* (2014.11); *H04N 19/167* (2014.11); *H04N 19/176* (2014.11)

(58) Field of Classification Search
CPC ..................................................... H04N 19/109
See application file for complete search history.

(56) References Cited

U.S. PATENT DOCUMENTS

2020/0036967 A1* 1/2020 Tsai ..................... H04N 19/176

* cited by examiner

*Primary Examiner* — Y Lee

(57) ABSTRACT

Provided are an inter prediction method and a terminal. The inter prediction method includes: obtaining target information, where the target information includes a predicted value derivation mode corresponding to a target picture frame and/or a predicted value derivation mode corresponding to each first block in the target picture frame; and performing inter prediction on each first block based on the target information, where the target picture frame is a to-be-encoded picture frame, and the first block is a to-be-encoded block; or the target picture frame is a to-be-decoded picture frame, and the first block is a to-be-decoded block.

20 Claims, 5 Drawing Sheets

INTER-FRAME PREDICTION METHOD AND TERMINAL

CROSS-REFERENCE TO RELATED APPLICATIONS

This application is a continuation of International Patent Application No. PCT/CN2023/088030, filed on Apr. 13, 2023, which claims priority to Chinese Patent Application No. 202210400128.1, filed in China on Apr. 15, 2022, both of which are incorporated herein by reference in their entireties.

TECHNICAL FIELD

This application pertains to the field of video encoding and decoding technologies, and specifically, relates to an inter prediction method and a terminal.

BACKGROUND

Currently, during video encoding and decoding, a same predicted value derivation mode is used for inter prediction for all blocks in a to-be-encoded or to-be-decoded picture frame, to refine predicted values of boundary pixels of the blocks.

SUMMARY

Embodiments of this application provide an inter prediction method and a terminal.

According to a first aspect, an inter prediction method is provided. The method includes:
obtaining target information; and performing inter prediction on each first block, where the target picture frame is a to-be-encoded picture frame, and the first block is a to-be-encoded block; or the target picture frame is a to-be-decoded picture frame, and the first block is a to-be-decoded block.

According to a second aspect, an inter prediction method is provided. The method includes:
obtaining first motion information of the first block and second motion information of a second block, where the first block is adjacent to the second block;
determining, based on position information of the first block and the first motion information, at least one first pixel region associated with the first block;
determining a predicted value of each pixel in the first pixel region based on the first motion information and the second motion information; and
determining, based on the predicted value of each pixel, a target predicted value of each pixel in a second pixel region of the first block, where
the first block is a to-be-encoded block, and the second block is an encoded block; or the first block is a to-be-decoded block, and the second block is a decoded block.

According to a third aspect, an inter prediction apparatus is provided, including: an obtaining module, configured to obtain target information, where the target information includes a predicted value derivation mode corresponding to a target picture frame and/or a predicted value derivation mode corresponding to each first block in the target picture frame; and
a processing module, configured to perform inter prediction on each first block based on the target information, where
the target picture frame is a to-be-encoded picture frame, and the first block is a to-be-encoded block; or the target picture frame is a to-be-decoded picture frame, and the first block is a to-be-decoded block.

According to a fourth aspect, an inter prediction apparatus is provided, including:
an obtaining module, configured to obtain first motion information of the first block and second motion information of a second block, where the first block is adjacent to the second block;
a first determining module, configured to determine, based on position information of the first block and the first motion information, at least one first pixel region associated with the first block;
a second determining module, configured to determine a predicted value of each pixel in the first pixel region based on the first motion information and the second motion information; and
a third determining module, configured to determine, based on the predicted value of each pixel, a target predicted value of each pixel in a second pixel region of the first block, where
the first block is a to-be-encoded block, and the second block is an encoded block; or the first block is a to-be-decoded block, and the second block is a decoded block.

According to a fifth aspect, a terminal is provided, where the terminal includes a processor and a memory, the memory stores a program or instructions capable of running on the processor, and when the program or instructions are executed by the processor, the steps of the method according to the first aspect are implemented, or the steps of the method according to the second aspect are implemented.

According to a sixth aspect, a readable storage medium is provided, where the readable storage medium stores a program or instructions, and when the program or instructions are executed by a processor, the steps of the method according to the first aspect are implemented, or the steps of the method according to the second aspect are implemented.

According to a seventh aspect, a chip is provided, where the chip includes a processor and a communication interface, the communication interface is coupled to the processor, and the processor is configured to run a program or instructions, to implement the method according to the first aspect, or implement the steps of the method according to the second aspect.

According to an eighth aspect, a computer program or program product is provided, where the computer program or program product is stored in a storage medium, and the computer program or program product is executed by at least one processor to implement the steps of the method according to the first aspect, or implement the steps of the method according to the second aspect.

DETAILED DESCRIPTION

Figure 1:
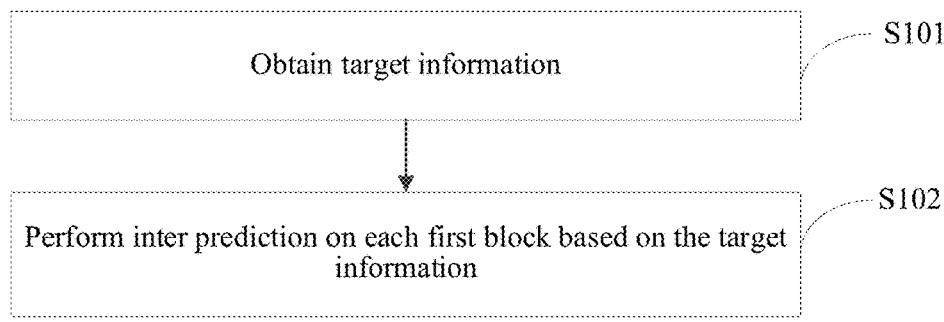
FIG. 1 is a flowchart of an inter prediction method according to an embodiment of this application.

The following clearly describes the technical solutions in the embodiments of this application with reference to the accompanying drawings in the embodiments of this application. Apparently, the described embodiments are only some rather than all of the embodiments of this application. All other embodiments obtained by a person of ordinary skill in the art based on the embodiments of this application shall fall within the protection scope of this application.

The terms "first", "second", and the like in this specification and the claims of this application are used to distinguish between similar objects rather than to describe a specific order or sequence. It should be understood that terms used in this way are interchangeable in appropriate circumstances so that the embodiments of this application can be implemented in other orders than the order illustrated or described herein. In addition, "first" and "second" are usually used to distinguish objects of a same type, and do not limit a quantity of objects. For example, there may be one or more first objects. In addition, in this specification and the claims, "and/or" represents at least one of connected objects, and the character "/" typically represents an "or" relationship between the associated objects.

An inter prediction apparatus corresponding to an inter prediction method in the embodiments of this application may be a terminal. The terminal may also be referred to as a terminal device or user equipment (User Equipment, UE). The terminal may be a terminal-side device such as a mobile phone, a tablet personal computer (Tablet Personal Computer), a laptop computer (Laptop Computer) or referred to as a notebook computer, a personal digital assistant (Personal Digital Assistant, PDA), a palmtop computer, a netbook, an ultra-mobile personal computer (ultra-mobile personal computer, UMPC), a mobile Internet device (Mobile Internet Device, MID), an augmented reality (augmented reality, AR)/virtual reality (virtual reality, VR) device, a robot, a wearable device (Wearable Device), vehicle user equipment (Vehicle User Equipment, VUE), pedestrian user equipment (Pedestrian User Equipment, PUE), smart household (a home appliance with a wireless communication function, for example, a refrigerator, a television, a washing machine, or furniture), a game console, a personal computer (personal computer, PC), a teller machine, or a self-service machine. The wearable device includes a smart watch, a smart band, a smart headset, smart glasses, smart jewelry (a smart bangle, a smart bracelet, a smart ring, a smart necklace, a smart anklet, a smart ankle chain, or the like), a smart wristband, smart clothing, or the like. It should be noted that a specific type of the terminal is not limited in the embodiments of this application.

The embodiments of this application provide an inter prediction method. The following describes in detail the inter prediction method provided in the embodiments of this application with reference to the accompanying drawings and by using some embodiments and application scenarios thereof.

FIG. 1 is a flowchart of an inter prediction method provided in this application. The inter prediction method provided in this embodiment includes the following steps.

S101: Obtain target information.

The inter prediction method provided in this embodiment may be applied to an encoder or a decoder. To describe the technical solution in detail, content of subsequent examples is described by using an example in which the inter prediction method is applied to a decoder.

In this step, the decoder obtains target information from a bitstream. The target information includes a predicted value derivation mode corresponding to a target picture frame and/or a predicted value derivation mode corresponding to each first block in the target picture frame. The target picture frame is a to-be-encoded picture frame, and the first block is a to-be-encoded block; or the target picture frame is a to-be-decoded picture frame, and the first block is a to-be-decoded block. Optionally, a first enable identifier corresponding to the target picture frame may be set to represent the predicted value derivation mode corresponding to the target picture frame, and a second enable identifier corresponding to a first block may be set to represent a predicted value derivation mode corresponding to the first block.

S102: Perform inter prediction on each first block based on the target information.

In this step, after the target information is obtained, the predicted value derivation mode corresponding to each first block in the target picture frame may be determined based on the target information.

In an optional implementation, the predicted value derivation mode corresponding to each first block in the target picture frame is determined based on the first enable identifier corresponding to the target picture frame. In this case, all first blocks correspond to a same predicted value derivation mode.

In another optional implementation, the predicted value derivation mode corresponding to each first block is determined based on the first enable identifier corresponding to the target picture frame and a second enable identifier corresponding to each first block.

In another optional implementation, the predicted value derivation mode corresponding to each first block is determined based on a second enable identifier corresponding to each first block.

It should be understood that, for a specific technical solution of determining, based on the target information, the predicted value derivation mode corresponding to each first block in the target picture frame, reference may be made to subsequent embodiments.

In this step, after the predicted value derivation mode corresponding to each first block is determined, inter prediction is performed on each first block by using a predicted value derivation mode corresponding to the first block to obtain a target predicted value of the first block.

In this embodiment of this application, target information is obtained, where the target information includes a predicted value derivation mode corresponding to a target picture frame and/or a predicted value derivation mode corresponding to each first block in the target picture frame; and inter prediction is performed on each first block based on the target information. To be specific, for any first block in a target picture frame, inter prediction is performed on the first block by using a corresponding predicted value derivation mode, to improve accuracy of a predicted value obtained through inter prediction on a block, and therefore improve efficiency of video encoding and decoding.

The following specifically describes how to perform inter prediction on each first block based on the target information in a case that the target information includes the predicted value derivation mode corresponding to the target picture frame.

Optionally, the performing inter prediction on each first block based on the target information includes at least one of the following:

in a case that the predicted value derivation mode corresponding to the target picture frame is a first derivation mode, determining that the predicted value derivation mode corresponding to each first block in the target picture frame is the first derivation mode, and performing inter prediction on each first block by using the first derivation mode;

in a case that the predicted value derivation mode corresponding to the target picture frame is a second derivation mode, determining that the predicted value derivation mode for each first block in the target picture frame is the second derivation mode, and performing inter prediction on each first block by using the second derivation mode; and in a case that the predicted value derivation mode corresponding to the target picture frame is a third derivation mode, determining that the predicted value derivation mode for each first block in the target picture frame is the third derivation mode, and performing inter prediction on each first block by using the third derivation mode.

In this embodiment, the predicted value derivation mode corresponding to each first block in the target picture frame may be determined based on only the predicted value derivation mode corresponding to the target picture frame, that is, the first enable identifier.

In this embodiment, in a case that the predicted value derivation mode corresponding to the target picture frame is the first derivation mode, it is determined that the predicted value derivation mode corresponding to each first block is the first derivation mode; in a case that the predicted value derivation mode corresponding to the target picture frame is the second derivation mode, it is determined that the predicted value derivation mode corresponding to each first block is the second derivation mode; and in a case that the predicted value derivation mode corresponding to the target picture frame is the third derivation mode, it is determined that the predicted value derivation mode corresponding to each first block is the third derivation mode.

In this embodiment, after the predicted value derivation mode corresponding to each first block is determined, inter prediction is performed on the first block by using the predicted value derivation mode.

For example, the following is set: The first enable identifier being 0 indicates the first derivation mode, the first enable identifier being 1 indicates the second derivation mode, and the first enable identifier being 2 indicates the third derivation mode. In this case, if the first enable identifier corresponding to the target picture frame is 0, it is determined that the predicted value derivation mode corresponding to each first block is the first derivation mode; if the first enable identifier corresponding to the target picture frame is 1, it is determined that the predicted value derivation mode corresponding to each first block is the second derivation mode; or if the first enable identifier corresponding to the target picture frame is 2, it is determined that the predicted value derivation mode corresponding to each first block is the third derivation mode.

For example, the following is set: The first enable identifier being 0 indicates the third derivation mode, and the first enable identifier being 1 indicates the first derivation mode. In this case, if the first enable identifier corresponding to the target picture frame is 0, it is determined that the predicted value derivation mode corresponding to each first block is the third derivation mode; or if the first enable identifier corresponding to the target picture frame is 1, it is determined that the predicted value derivation mode corresponding to each first block is the first derivation mode.

The first derivation mode is a predicted value derivation mode determined based on motion information corresponding to each first block, position information corresponding to each first block, and motion information corresponding to an adjacent block of each first block. For a detailed definition of the first derivation mode, refer to subsequent embodiments.

The second derivation mode is a predicted value derivation mode determined based on motion information corresponding to each first block, a preset pixel region corresponding to each first block, and motion information corresponding to an adjacent block of each first block. A difference between the second derivation mode and the first derivation mode lies in that a pixel region used in the second derivation mode is a preset pixel region, and a pixel region used in the first derivation mode is a pixel region determined based on position information corresponding to a first block and motion information of an adjacent block and/or based on position information corresponding to a first block and motion information of the first block. Details are not described herein.

The third derivation mode is a predicted value derivation mode determined based on the motion information corresponding to each first block, and no motion information of an adjacent block is used in the third derivation mode. The third derivation mode is not based on an overlapped block motion compensation (Overlapped block motion compensation, OBMC) technology. For a specific definition of OBMC, refer to subsequent embodiments.

It should be understood that, for a region including a sharp texture in an image, for example, a text region in the image, texture blurring may occur when inter prediction is performed on the region through OBMC, reducing image quality. Therefore, for a first block located in a region including a sharp texture, it is determined that a predicted value derivation mode corresponding to the first block is the third derivation mode, to be specific, inter prediction is not performed on the first block by using the OBMC technology, to avoid a phenomenon of texture blurring after inter prediction and therefore improve image quality.

The following specifically describes how to perform inter prediction on each first block in the target picture frame based on the target information in a case that the target information includes the predicted value derivation mode corresponding to each first block in the target picture frame.

Optionally, the performing inter prediction on each first block in the target picture frame based on the target information includes at least one of the following:

in a case that a predicted value derivation mode corresponding to any first block is a first derivation mode, performing inter prediction on the first block by using the first derivation mode;

in a case that a predicted value derivation mode corresponding to any first block is a second derivation mode, performing inter prediction on the first block by using the second derivation mode; and in a case that a predicted value derivation mode corresponding to any first block is a third derivation mode, performing inter prediction on the first block by using the third derivation mode.

In this embodiment, the predicted value derivation mode corresponding to each first block in the target picture frame may be determined based on only the predicted value derivation mode corresponding to each first block in the target picture frame, that is, the second enable identifier.

In this embodiment, in a case that a predicted value derivation mode corresponding to a first block is a first derivation mode, it is determined that the predicted value derivation mode corresponding to the first block is the first derivation mode; in a case that a predicted value derivation mode corresponding to a first block is a second derivation mode, it is determined that the predicted value derivation mode corresponding to the first block is the second derivation mode; and in a case that a predicted value derivation mode corresponding to a first block is a third derivation mode, it is determined that the predicted value derivation mode corresponding to the first block is the third derivation mode.

In this embodiment, after the predicted value derivation mode corresponding to each first block is determined, inter prediction is performed on the first block by using the predicted value derivation mode.

For example, the following is set: The second enable identifier being 0 indicates the first derivation mode, the second enable identifier being 1 indicates the second derivation mode, and the second enable identifier being 2 indicates the third derivation mode. In this case, if a second enable identifier corresponding to a first block is 0, it is determined that a predicted value derivation mode corresponding to the first block is the first derivation mode; if a second enable identifier corresponding to a first block is 1, it is determined that a predicted value derivation mode corresponding to the first block is the second derivation mode; or if a second enable identifier corresponding to a first block is 2, it is determined that a predicted value derivation mode corresponding to the first block is the third derivation mode.

For example, the following is set: The second enable identifier being 0 indicates the third derivation mode, and the second enable identifier being 1 indicates the first derivation mode. In this case, if a second enable identifier corresponding to a first block is 0, it is determined that a predicted value derivation mode corresponding to the first block is the third derivation mode; or if a second enable identifier corresponding to a first block is 1, it is determined that a predicted value derivation mode corresponding to the first block is the first derivation mode.

For example, the following is set: The second enable identifier being 0 indicates the first derivation mode, and the second enable identifier being 1 indicates the second derivation mode. In this case, if a second enable identifier corresponding to a first block is 0, it is determined that a predicted value derivation mode corresponding to the first block is the first derivation mode; or if a second enable identifier corresponding to a first block is 1, it is determined that a predicted value derivation mode corresponding to the first block is the third derivation mode.

In this embodiment, the predicted value derivation mode corresponding to each first block is obtained, and then inter prediction is performed on each first block based on the predicted value derivation mode corresponding to each first block. In this way, for all first blocks included in a block, inter prediction may be performed by using a plurality of predicted value derivation modes, so that an inter prediction mode for a block is more flexible and accuracy of a predicted value of a block is improved.

Optionally, the performing inter prediction on each first block in the target picture frame based on the target information includes:

in a case that the predicted value derivation mode corresponding to the target picture frame is a third derivation mode, performing inter prediction on each first block by using the third derivation mode; or in a case that the predicted value derivation mode corresponding to the target picture frame is not a third derivation mode, performing inter prediction on each first block based on the predicted value derivation mode corresponding to each first block in the target picture frame.

In this embodiment, the predicted value derivation mode corresponding to each first block may be determined based on the predicted value derivation mode corresponding to the target picture frame and the predicted value derivation mode corresponding to each first block in the target picture frame. To be specific, the predicted value derivation mode corresponding to each first block in the target picture frame is determined based on the first enable identifier and the second enable identifier.

In this embodiment, in a case that the predicted value derivation mode corresponding to the target picture frame is the third derivation mode, it is determined that the predicted value derivation mode corresponding to each first block in the target picture frame is the third derivation mode; or in a case that the predicted value derivation mode corresponding to the target picture frame is not the third derivation mode, the predicted value derivation mode corresponding to each first block in the target picture frame is obtained, to determine the predicted value derivation mode corresponding to each first block.

In this embodiment, after the predicted value derivation mode corresponding to each first block is determined, inter prediction is performed on the first block by using the predicted value derivation mode.

For example, the following is set: The first enable identifier being 0 indicates the third derivation mode, the first enable identifier being 1 indicates a non-third derivation mode, the second enable identifier being 0 indicates the first derivation mode, the second enable identifier being 1 indicates the second derivation mode, and the second enable identifier being 2 indicates the third derivation mode. In this case, if the first enable identifier is 0, it is determined that the predicted value derivation mode corresponding to each first block in the target picture frame is the third derivation mode; if the first enable identifier is 1 and the second enable identifier is 0, it is determined that the predicted value derivation mode corresponding to each first block is the first derivation mode; or if the first enable identifier is 1 and the second enable identifier is 1, it is determined that the predicted value derivation mode corresponding to each first block is the second derivation mode.

For example, the following is set: The first enable identifier being 0 indicates the third derivation mode, the first enable identifier being 1 indicates a non-third derivation mode, the second enable identifier being 0 indicates the third derivation mode, and the second enable identifier being 1 indicates the first derivation mode. In this case, if the first enable identifier is 0, it is determined that the predicted value derivation mode corresponding to each first block in the target picture frame is the third derivation mode; if the first enable identifier is 1 and the second enable identifier is 0, it is determined that the predicted value derivation mode corresponding to each first block is the third derivation mode; or if the first enable identifier is 1 and the second enable identifier is 1, it is determined that the predicted value derivation mode corresponding to each first block is the first derivation mode.

In this embodiment, the predicted value derivation mode corresponding to the target picture frame is first determined, and in a case that the predicted value derivation mode corresponding to the target picture frame is not the third derivation mode, the second enable identifier corresponding to each first block is further obtained. In this way, bitstreams during inter prediction are reduced.

Optionally, in a case that the predicted value derivation mode corresponding to each first block in the target picture frame is a first derivation mode, the performing inter prediction on each first block based on the target information includes:
  obtaining first motion information of the first block and second motion information of a second block;
  determining, based on position information of the first block and the first motion information, at least one first pixel region associated with the first block;
  determining a predicted value of each pixel in the first pixel region based on the first motion information and the second motion information; and
  determining, based on the predicted value of each pixel, a target predicted value of each pixel in a second pixel region of the first block.

The first block is a to-be-encoded block, and the second block is an encoded block adjacent to the first block; or the first block is a to-be-decoded block, and the second block is a decoded block adjacent to the first block. The first block and the second block meet any one of the following conditions:
  1. A prediction direction of the first block is different from a prediction direction of the second block.
  2. A prediction direction of the first block is the same as a prediction direction of the second block, but the prediction directions point to different reference frames.
  3. A prediction direction of the first block is the same as a prediction direction of the second block, and the prediction directions point to a same reference frame, but a motion vector of the first block is different from a motion vector of the second block.

In this step, in a case that the first block and the second block meet the foregoing condition, the first motion information of the first block and the second motion information of the second block are obtained.

Figure 2:
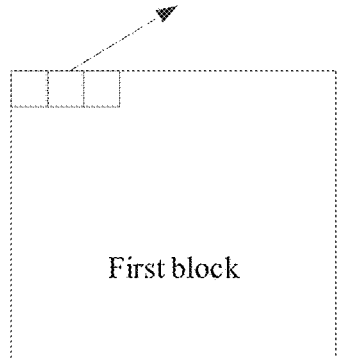
FIG. 2 is a first schematic diagram of an application scenario of an inter prediction method according to an embodiment of this application.
Figure 3:
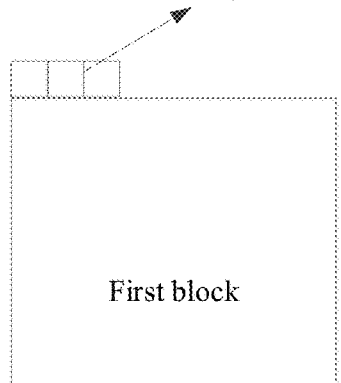
FIG. 3 is a second schematic diagram of an application scenario of an inter prediction method according to an embodiment of this application.
Figure 4:
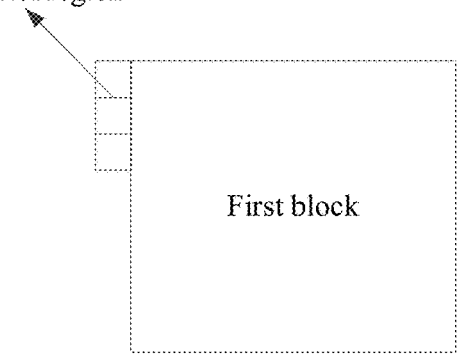
FIG. 4 is a third schematic diagram of an application scenario of an inter prediction method according to an embodiment of this application.

The motion information includes a prediction direction and a motion vector. In this step, prediction may be performed by using the motion vector and the prediction direction based on a position of the first block to obtain at least one first pixel region associated with the first block. As shown in FIG. 2, the first pixel region may be a rectangular region at the top in the first block. Alternatively, as shown in FIG. 3, the first pixel region may be a rectangular region adjacent to a top edge of the first block. Alternatively, as shown in FIG. 4, the first pixel region may be a rectangular region adjacent to a left edge of the first block. Alternatively, the first pixel region may be a rectangular region on the left in the first block.

In this step, after the first pixel region is determined, the predicted value of each pixel in the first pixel region is determined based on the first motion information and the second motion information. For a specific technical solution of determining the predicted value of each pixel in the first pixel region, refer to subsequent embodiments. It should be understood that each pixel in the first pixel region includes at least two predicted values, where one predicted value is determined based on the first motion information, and the other predicted value is determined based on the second motion information.

Figure 5:
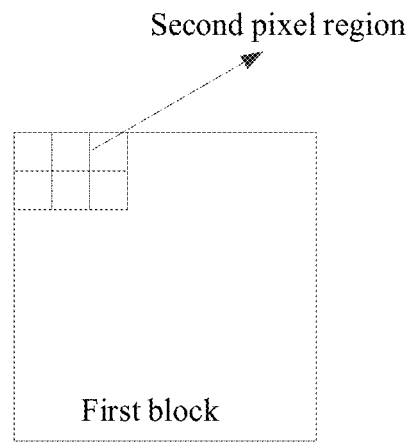
FIG. 5 is a fourth schematic diagram of an application scenario of an inter prediction method according to an embodiment of this application.
Figure 6:
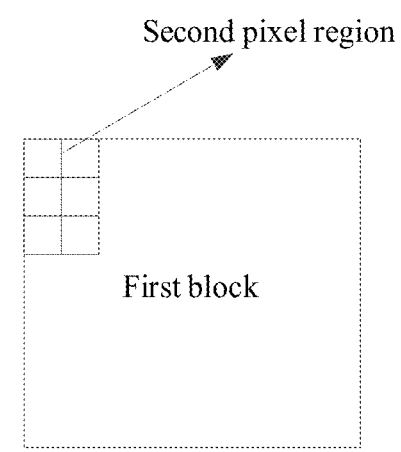
FIG. 6 is a fifth schematic diagram of an application scenario of an inter prediction method according to an embodiment of this application.

The second pixel region is a partial pixel region of the first block, and each pixel in the second pixel region is also referred to as a boundary pixel. For case of understanding, refer to FIG. 5 and FIG. 6. FIG. 5 shows a position of the second pixel region in a case that the first pixel region is a rectangular region at the top in the first block or the first pixel region is a rectangular region adjacent to the top edge of the first block. FIG. 6 shows a position of the second pixel region in a case that the first pixel region is a rectangular region on the left in the first block or the first pixel region is a rectangular region adjacent to the left edge of the first block.

In this step, after the predicted value of each pixel in the first pixel region is determined, the target predicted value of each pixel in the second pixel region is determined based on the predicted value of each pixel. For a specific technical solution, refer to subsequent embodiments.

In this embodiment of this application, the first motion information of the first block and the second motion information of the second block are obtained; the at least one first pixel region associated with the first block is determined based on the position information of the first block and the first motion information; the predicted value of each pixel in the first pixel region is determined based on the first motion information and the second motion information; and the target predicted value of each pixel in the second pixel region of the first block is determined based on the predicted value of each pixel. In this embodiment of this application, the predicted value of each pixel in the first pixel region is determined based on the first motion information and the second motion information. In this way, a motion difference between the first block and the second block is fully considered during refinement of a predicted value of a boundary pixel, to improve accuracy of a refined predicted value of the boundary pixel and therefore improve efficiency of video encoding and decoding.

Optionally, the determining a predicted value of each pixel in the first pixel region based on the first motion information and the second motion information includes:
  for any first pixel in a first pixel sub-region, determining a reconstructed value of a first reference pixel that is in a first reference frame and that corresponds to the first pixel as a first predicted value of the first pixel; and determining a reconstructed value of a second reference pixel that is in a second reference frame and that corresponds to the first pixel as a second predicted value of the first pixel.

In this embodiment, the first pixel region includes the first pixel sub-region. The first pixel sub-region is a rectangular region at the top in the first block or a rectangular region on the left in the first block, or the first pixel sub-region is a rectangular region adjacent to a top edge of the first block, or the first pixel sub-region is a rectangular region adjacent to a left edge of the first block, or the first pixel sub-region is a rectangular region including a rectangular region adjacent to a top edge of the first block and a rectangular region at the top in the first block, or the first pixel sub-region is a rectangular region including a rectangular region adjacent to a left edge of the first block and a rectangular region on the left in the first block. In this embodiment, a pixel included in the first pixel sub-region is referred to as a first sub-pixel.

The motion information includes a prediction direction, reference frame information, and a motion vector. In this embodiment, the first reference frame and the first reference pixel may be determined based on a first motion vector and first reference frame information, and the first reference pixel is a reconstructed pixel that is located in the first reference frame and that has a same position as the first pixel sub-region. Then a reconstructed value of a pixel in the first reference frame to which the first motion vector points is determined as the first predicted value based on the first reference pixel according to a first prediction direction.

The second reference frame and the second reference pixel may be determined based on a second motion vector and second reference frame information, and the second reference pixel is a reconstructed pixel that is located in the second reference frame and that has a same position as the first pixel sub-region. Then a reconstructed value of a pixel in the second reference frame to which the second motion vector points is determined as the second predicted value based on the second reference pixel according to a second prediction direction.

Optionally, the determining, based on the predicted value of each pixel, a target predicted value of each pixel in a second pixel region of the first block includes:
calculating a first difference between a first predicted value and a second predicted value that correspond to each first pixel in the first pixel sub-region; and
in a case that the first difference is greater than a first preset threshold, determining the target predicted value of each pixel in the second pixel region based on position information of each pixel in the second pixel region and the first motion information; or
in a case that the first difference is less than or equal to the first preset threshold, performing weighted summation on a third predicted value and a fourth predicted value of each pixel in the second pixel region based on a preset first weight value combination to obtain the target predicted value of each pixel in the second pixel region.

In this embodiment, after the first predicted value and the second predicted value of each first pixel are obtained, the first difference between the first predicted value and the second predicted value is calculated. Optionally, the first difference may be an absolute value of a difference between the first predicted value and the second predicted value, or a mean between the first predicted value and the second predicted value, or a variance between the first predicted value and the second predicted value, or a mean square error between the first predicted value and the second predicted value. This is not specifically limited herein.

In this embodiment, each pixel in the second pixel region includes the third predicted value and the fourth predicted value, where the third predicted value is determined based on the first motion information, and the fourth predicted value is determined based on the second motion information. It should be understood that a manner of determining the third predicted value is the same as the manner of determining the first predicted value in the foregoing embodiments, and a manner of determining the fourth predicted value is the same as the manner of determining the second predicted value in the foregoing embodiments. Details are not described herein again.

In this embodiment, the first preset threshold is further set in advance. After the first difference is obtained, for each first pixel, a magnitude relationship between the first difference and the first preset threshold is determined through comparison. If the first difference is greater than the first preset threshold, for each pixel in the second pixel region, a target predicted value of the pixel is determined based on position information of the pixel and the first motion information. Specifically, the pixel is used as a motion starting point, the motion starting point is offset based on the first motion vector and the first prediction direction in the first motion information, and a pixel obtained through offsetting is determined, where the pixel obtained through offsetting is located in the first reference frame. Further, a reconstructed value of the pixel obtained through offsetting is determined as the target predicted value of the pixel. It should be understood that, in a case that the first pixel region is located in the first block, a first predicted value of each first pixel in the first pixel region is determined as a target predicted value of a pixel that is in the second pixel region and that corresponds to the first pixel.

If the first difference is less than or equal to the first preset threshold, weighted summation is performed on the third predicted value and the fourth predicted value of each pixel in the second pixel region by using the first weight value combination to obtain the target predicted value of each pixel in the second pixel region. It should be understood that the first weight value combination includes at least one weight group, the weight group includes a first weight value and a second weight value, the first weight value corresponds to the third predicted value, and the second weight value corresponds to the fourth predicted value.

Specifically, the target predicted value of each pixel in the second pixel region may be calculated by using the following formula:

$$\text{shift} = \log_2(w1_1 + w1_2)$$

$$\text{offset} = (w1_1 + w1_2)/2$$

$$\text{Pixel}(i, j) = (w1_1 \times \text{Pixel3}(i, j) + w1_2 \times \text{Pixel4}(i, j) + \text{offset}) \gg \text{shift, where}$$

Pixel represents the target predicted value, $w1_1$ represents the first weight value, $w1_2$ represents the second weight value, Pixel3 represents the third predicted value, and Pixel4 represents the fourth predicted value.

It should be understood that the first block may be a luminance block or a chrominance block, and a first weight value combination corresponding to the first block as a luminance block may be different from a first weight value combination corresponding to the first block as a chrominance block.

Optionally, the determining a predicted value of each pixel in the first pixel region based on the first motion information and the second motion information includes:

for any second pixel in a second pixel sub-region, determining a reconstructed value of a third reference pixel that is in a third reference frame and that corresponds to the second pixel as a fifth predicted value of the second pixel;

determining a reconstructed value of a fourth reference pixel that is in a fourth reference frame and that corresponds to the second pixel as a sixth predicted value of the second pixel;

for any third pixel in a third pixel sub-region, determining a reconstructed value of a fifth reference pixel that is in a fifth reference frame and that corresponds to the third pixel as a seventh predicted value of the third pixel; and determining a reconstructed value of a sixth reference pixel that is in a sixth reference frame and that corresponds to the third pixel as an eighth predicted value of the third pixel.

In this embodiment, the first pixel region includes the second pixel sub-region and the third pixel sub-region. The second pixel sub-region is a rectangular region at the top in the first block, or the second pixel sub-region is a rectangular region on the left in the first block, or the third pixel sub-region is a rectangular region adjacent to a top edge of the first block, or the third pixel sub-region is a rectangular region adjacent to a left edge of the first block. In this embodiment, a pixel included in the second pixel sub-region is referred to as a second pixel, and a pixel included in the third pixel sub-region is referred to as a third pixel.

As described above, the first motion information includes the first prediction direction, the first reference frame information, and the first motion vector. In this embodiment, the third reference frame and the third reference pixel may be determined based on the first motion information, and then a reconstructed value of a pixel in the third reference frame to which the first motion vector points is determined as the fifth predicted value based on the third reference pixel according to the first prediction direction. It should be understood that a specific technical solution of determining the fifth predicted value of the second pixel in this embodiment is the same as the foregoing technical solution of determining the first predicted value of the first pixel. Details are not described herein again.

As described above, the second motion information includes the second prediction direction, the second reference frame information, and the second motion vector. In this embodiment, the fourth reference frame and the fourth reference pixel may be determined based on the second motion information, and then a reconstructed value of a pixel in the fourth reference frame to which the second motion vector points is determined as the sixth predicted value based on the fourth reference pixel according to the second prediction direction. It should be understood that a specific technical solution of determining the sixth predicted value of the second pixel in this embodiment is the same as the foregoing technical solution of determining the second predicted value of the second pixel. Details are not described herein again.

In this embodiment, the seventh predicted value of the third pixel may be determined by using a technical solution same as the foregoing technical solution of determining the fifth predicted value of the second pixel. Details are not described herein again.

In this embodiment, the eighth predicted value of the third pixel may be determined by using a technical solution same as the foregoing technical solution of determining the sixth predicted value of the second pixel. Details are not described herein again.

Optionally, the determining, based on the predicted value of each pixel, a target predicted value of each pixel in a second pixel region of the first block includes:

determining a second difference and a third difference of each target pixel based on the fifth predicted value, the sixth predicted value, the seventh predicted value, and the eighth predicted value; and in a case that the second difference and the third difference meet a preset condition, determining the target predicted value of each pixel in the second pixel region based on position information of each pixel in the second pixel region and the first motion information; or in a case that the second difference and the third difference do not meet the preset condition, performing weighted summation on a ninth predicted value and a tenth predicted value of each pixel in the second pixel region based on a preset second weight value combination to obtain the target predicted value of each pixel in the second pixel region.

In this embodiment, after a fifth predicted value and a sixth predicted value of each second pixel and a seventh predicted value and an eighth predicted value of each third pixel are obtained, a second difference and a third difference of a target pixel may be determined, where the target pixel includes a second pixel and a third pixel. To be specific, a second difference and a third difference of the second pixel and a second difference and a third difference of the third pixel may be determined. For a specific technical solution of determining a second difference and a third difference of a target pixel, refer to subsequent embodiments.

It should be understood that each pixel in the second pixel region includes a ninth predicted value and a tenth predicted value, where the ninth predicted value is determined based on the first motion information, and the tenth predicted value is determined based on the second motion information. It should be understood that a manner of determining the ninth predicted value is the same as the manner of determining the first predicted value in the foregoing embodiments, and a manner of determining the tenth predicted value is the same as the manner of determining the second predicted value in the foregoing embodiments. Details are not described herein again.

In this embodiment, the preset condition is set in advance. If the second difference and the third difference meet the preset condition, it indicates that a motion mode of a boundary pixel in the first block is more consistent with that of the first block. In this case, for each pixel in the second pixel region, a target predicted value of the pixel is determined based on position information of the pixel and the first motion information. For a specific implementation, refer to the foregoing embodiments. Details are not described herein again.

If the second difference and the third difference do not meet the preset condition, weighted summation may be performed on the ninth predicted value and the tenth predicted value of each pixel in the second pixel region by using the second weight value combination to obtain the target predicted value of each pixel in the second pixel region. It should be understood that the second weight value combination includes at least one weight group, the weight group includes a third weight value and a fourth weight value, the third weight value corresponds to the ninth predicted value, the fourth weight value corresponds to the tenth predicted value. Optionally, the second weight value combination may be the same as the first weight value combination.

A specific implementation of weighted summation is consistent with the foregoing implementation of performing weighted summation on the third predicted value and the fourth predicted value by using the first weight value combination. Details are not described herein again.

Optionally, the determining a second difference and a third difference based on the fifth predicted value, the sixth predicted value, the seventh predicted value, and the eighth predicted value includes:

determining a difference between the fifth predicted value and the sixth predicted value as the second difference, and determining a difference between the seventh predicted value and the eighth predicted value as the third difference; or determining a difference between the fifth predicted value and the seventh predicted value as the second difference, and determining a difference between the sixth predicted value and the eighth predicted value as the third difference.

In an optional implementation, the difference between the fifth predicted value and the sixth predicted value is determined as the second difference, and the difference between the seventh predicted value and the eighth predicted value is determined as the third difference.

In this implementation, the second difference may be an absolute value of a difference between the fifth predicted value and the sixth predicted value, or a mean between the fifth predicted value and the sixth predicted value, or a variance between the fifth predicted value and the sixth predicted value, or a mean square error between the fifth predicted value and the sixth predicted value. This is not specifically limited herein.

The third difference may be an absolute value of a difference between the seventh predicted value and the eighth predicted value, or a mean between the seventh predicted value and the eighth predicted value, or a variance between the seventh predicted value and the eighth predicted value, or a mean square error between the seventh predicted value and the eighth predicted value. This is not specifically limited herein.

In another optional implementation, the difference between the fifth predicted value and the seventh predicted value is determined as the second difference, and the difference between the sixth predicted value and the eighth predicted value is determined as the third difference.

In this implementation, the second difference may be an absolute value of a difference between the fifth predicted value and the seventh predicted value, or a mean between the fifth predicted value and the seventh predicted value, or a variance between the fifth predicted value and the seventh predicted value, or a mean square error between the fifth predicted value and the seventh predicted value. This is not specifically limited herein.

The third difference may be an absolute value of a difference between the sixth predicted value and the eighth predicted value, or a mean between the sixth predicted value and the eighth predicted value, or a variance between the sixth predicted value and the eighth predicted value, or a mean square error between the sixth predicted value and the eighth predicted value. This is not specifically limited herein.

Optionally, the preset condition includes any one of the following:

the second difference is less than the third difference;

a ratio of the second difference to the third difference is less than a second preset threshold;

a ratio of the third difference to the second difference is less than the second preset threshold;

the second difference is greater than a third preset threshold, and a ratio of the second difference to the third difference is less than the second preset threshold; or the second difference is greater than the third preset threshold, and a ratio of the third difference to the second difference is less than the second preset threshold.

In an implementation of this embodiment, a magnitude relationship between the second difference and the third preset threshold is first determined through comparison, and in a case that the second difference is greater than the third preset threshold, a magnitude relationship between the ratio of the second difference to the third difference and the second preset threshold is determined through comparison, or a magnitude relationship between the ratio of the third difference to the second difference and the second preset threshold is determined through comparison. The magnitude relationship between the second difference and the third preset threshold is first determined through comparison, so that a motion difference between the first block and the second block is more fully considered during refinement of a predicted value of a boundary pixel.

Optionally, the first pixel region meets at least one of the following:

the first pixel region is an encoded or decoded pixel region that includes M1 rows and N1 columns of pixels adjacent to a top edge of the first block;

the first pixel region is an encoded or decoded pixel region that includes M2 rows and N2 columns of pixels adjacent to a left edge of the first block;

the first pixel region is an unencoded or undecoded pixel region that includes M3 rows and N3 columns of pixels located at the top in the first block;

the first pixel region is an unencoded or undecoded pixel region that includes M4 rows and N4 columns of pixels located on the left in the first block;

the first pixel region is an M5-row N5-column pixel region that includes an encoded or decoded pixel region adjacent to a top edge of the first block and an unencoded or undecoded pixel region at the top in the first block; and the first pixel region is an M6-row N6-column pixel region that includes an encoded or decoded pixel region adjacent to a left edge of the first block and an unencoded or undecoded pixel region on the left in the first block, where M1, M2, M3, M4, M5, M6, N1, N2, N3, N4, N5, and N6 are all positive integers.

In an optional implementation, the first pixel region is an unencoded or undecoded pixel region that includes M3 rows and N3 columns at the top in the first block. For ease of understanding, refer to FIG. 2. In a scenario shown in FIG. 2, the first pixel region is a rectangular region that includes one row and three columns of pixels at the top in the first block.

In another optional implementation, the first pixel region is an encoded or decoded pixel region that includes M1 rows and N1 columns adjacent to the top edge of the first block. For case of understanding, refer to FIG. 3. In a scenario shown in FIG. 3, the first pixel region is a rectangular region that includes one row and three columns of pixels adjacent to the top edge of the first block.

In another optional implementation, the first pixel region is an encoded or decoded pixel region that includes M2 rows and N2 columns adjacent to the left edge of the first block. For case of understanding, refer to FIG. 4. In a scenario shown in FIG. 4, the first pixel region is a rectangular region that includes three rows and one column adjacent to the left edge of the first block.

In another optional implementation, the first pixel region may be an encoded or decoded pixel region that includes some pixels adjacent to the top edge of the first block, and an encoded or decoded pixel region that includes some adjacent pixels adjacent to the left edge of the first block. In this case, the first pixel region is in an "L" shape.

In this embodiment, a position relationship between the first pixel region and the first block is limited, to fully consider a motion difference between the first block and each block adjacent to the first block, and improve accuracy of a refined predicted value of a boundary pixel.

The embodiments of this application further provide an inter prediction method. The following describes in detail the inter prediction method provided in the embodiments of this application with reference to the accompanying drawings and by using some embodiments and application scenarios thereof. For case of understanding, the following describes some content included in the embodiments of this application.

In a case that a boundary of a block does not fit a contour of a current block, a motion mode of a boundary pixel of the current block may be consistent with that of the current block, or may be consistent with that of an adjacent block. A predicted value, determined based on motion information of the current block, of the boundary pixel may be greatly different from a real predicted value, reducing efficiency of video encoding and decoding. The current block may be a to-be-encoded block, and the adjacent block is an encoded block; or the current block may be a to-be-decoded block, and the adjacent block is a decoded block.

Currently, the predicted value of the boundary pixel of the current block may be refined by using an OBMC technology, to resolve the foregoing technical problem. The OBMC technology is an inter prediction method. The OBMC technology is specifically described below.

Case 1: Inter Prediction Modes for Pixels in a Current Block are the Same.

Figure 7:
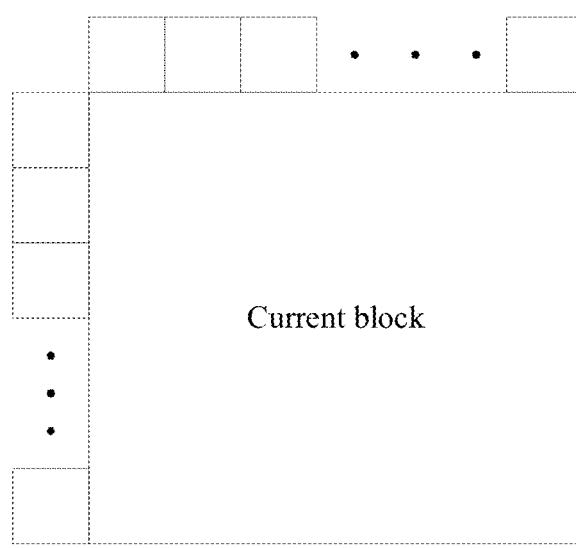
FIG. 7 is a first schematic diagram of an application scenario of a related inter prediction method.

In this case, motion information of an adjacent block is obtained in a case that the adjacent block is in an inter prediction mode rather than an intra block copy mode and a motion mode of the adjacent block is inconsistent with a motion mode of the current block. Refer to FIG. 7. The adjacent block may be a block adjacent to a top edge of the current block, or a block adjacent to a left edge of the current block.

In a case that any one of the following conditions is met, it can be determined that the motion mode of the adjacent block is inconsistent with the motion mode of the current block.
1. A prediction direction of the adjacent block is different from a prediction direction of the current block.
2. A prediction direction of the adjacent block is the same as a prediction direction of the current block, but the prediction directions point to different reference frames.
3. A prediction direction of the adjacent block is the same as a prediction direction of the current block, and the prediction directions point to a same reference frame, but a motion vector of the adjacent block is different from a motion vector of the current block.

After the motion information of the adjacent block is obtained, a first predicted value is obtained based on motion information of the current block, and a second predicted value is obtained based on the motion information of the adjacent block. A predicted value of a boundary pixel of the current block is refined by using the first predicted value and the second predicted value.

Specifically, if the current block is a luminance subblock, weighted summation may be performed on the first predicted value and the second predicted value by using the following formula, to obtain a refined predicted value of the boundary pixel:

$$NewPixel(i, j) = (26 \times Pixel1(i, j) + 6 \times Pixel2(i, j) + 16) \gg 5$$

$$NewPixel(i, j) = (7 \times Pixel1(i, j) + Pixel2(i, j) + 4) \gg 3$$

$$NewPixel(i, j) = (15 \times Pixel1(i, j) + Pixel2(i, j) + 8) \gg 4$$

$$NewPixel(i, j) = (31 \times Pixel1(i, j) + Pixel2(i, j) + 16) \gg 5, \text{ where}$$

i represents a column coordinate of the boundary pixel in the current block, j represents a row coordinate of the boundary pixel in the current block, Pixel1 represents the first predicted value of the boundary pixel, Pixel2 represents the second predicted value of the boundary pixel, and NewPixel represents the refined predicted value of the boundary pixel.

If the current block is a chrominance subblock, weighted summation may be performed on the first predicted value and the second predicted value by using the following formula, to obtain a refined predicted value of the boundary pixel:

$$NewPixel(i, j) = (26 \times Pixel1(i, j) + 6 \times Pixel2(i, j) + 16) \gg 5, \text{ where}$$

NewPixel represents the refined predicted value of the boundary pixel.

It should be understood that an application scenario corresponding to the foregoing formula is that a pixel region of the boundary pixel includes four rows or four columns, and in other application scenarios, a pixel region of the boundary pixel is not specifically limited.

Case 2: The current block is an encoded block, and an inter prediction mode is an affine mode; or the current block is a decoded block, and an inter prediction mode is a motion vector refinement mode.

Figure 8:
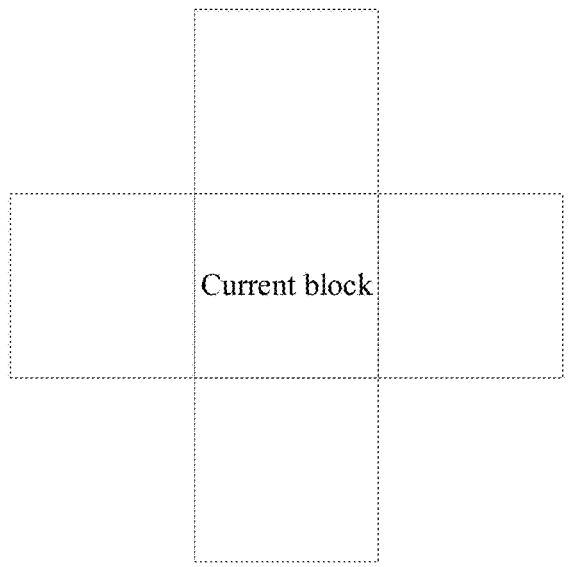
FIG. 8 is a second schematic diagram of an application scenario of a related inter prediction method.

In this case, motion information of four adjacent blocks that are adjacent to a top edge, a bottom edge, a left edge, and a right edge of the current block is obtained. Refer to FIG. 8. FIG. 8 shows a position relationship between the adjacent blocks and the current block in the foregoing case.

A first predicted value is obtained based on motion information of the adjacent block, and second predicted values are obtained based on the motion information of the adjacent blocks in a case that the current block and the adjacent blocks meet any one of the following conditions.
1. Prediction directions of the adjacent blocks are different from a prediction direction of the current block.
2. Prediction directions of the adjacent blocks are the same as a prediction direction of the current block, but the prediction directions point to different reference frames.

3. Prediction directions of the adjacent blocks are the same as a prediction direction of the current block, and the prediction directions point to a same reference frame, but absolute values of differences between motion vectors of the adjacent blocks and a motion vector of the current block are greater than a preset threshold.

A predicted value of a boundary pixel of the current block is refined by using the first predicted value and the second predicted values. Specifically, weighted summation may be performed on the first predicted value and the second predicted values by using the following formula, to obtain a refined predicted value of the boundary pixel:

$$\text{rem\_w}(i, j) = (32 - w(i) - w(\text{width} - i) - w(j) - w(\text{height} - j))$$

$$\text{subNewPixel}(i, j) =$$

$$(\text{subPixel2}_L(i, j) \times w(i) + \text{subPixel2}_R(i, j) \times w(\text{width} - 1 - i) +$$

$$\text{subPixel2}_T(i, j) \times w(j) + \text{subPixel2}_B(i, j) \times w(\text{height} - 1 - j) +$$

$$\text{subPixel1} \times \text{rem\_w}(i, j) + 16) \gg 5, \text{ where}$$

i represents a column coordinate of the boundary pixel in the current block, j represents a row coordinate of the boundary pixel in the current block, subNewPixel represents the refined predicted value of the boundary pixel, subPixel2$_L$, subPixel2$_R$, subPixel2$_T$, and subPixel2$_B$ represent the second predicted values determined based on the motion information of the adjacent blocks, width represents the number of columns of the adjacent block, height represents the number of rows of the adjacent block, w represents a preset weight combination, and a weight combination corresponding to the current block as a luminance block is different from a weight combination corresponding to the current block as a chrominance block.

It should be understood that an application scenario corresponding to the foregoing formula is that a pixel region of the boundary pixel includes four rows or four columns, and in other application scenarios, a pixel region of the boundary pixel is not specifically limited.

In the foregoing process of refining a predicted value of a boundary pixel by using the OBMC technology, a difference between a motion mode of a current block and a motion mode of an adjacent block is not considered. Consequently, a refined predicted value of the boundary pixel is inaccurate, reducing efficiency of video encoding and decoding.

Based on the foregoing cases, how to improve accuracy of a refined predicted value of a boundary pixel and further improve efficiency of video encoding and decoding is a technical problem to be resolved.

Figure 9:
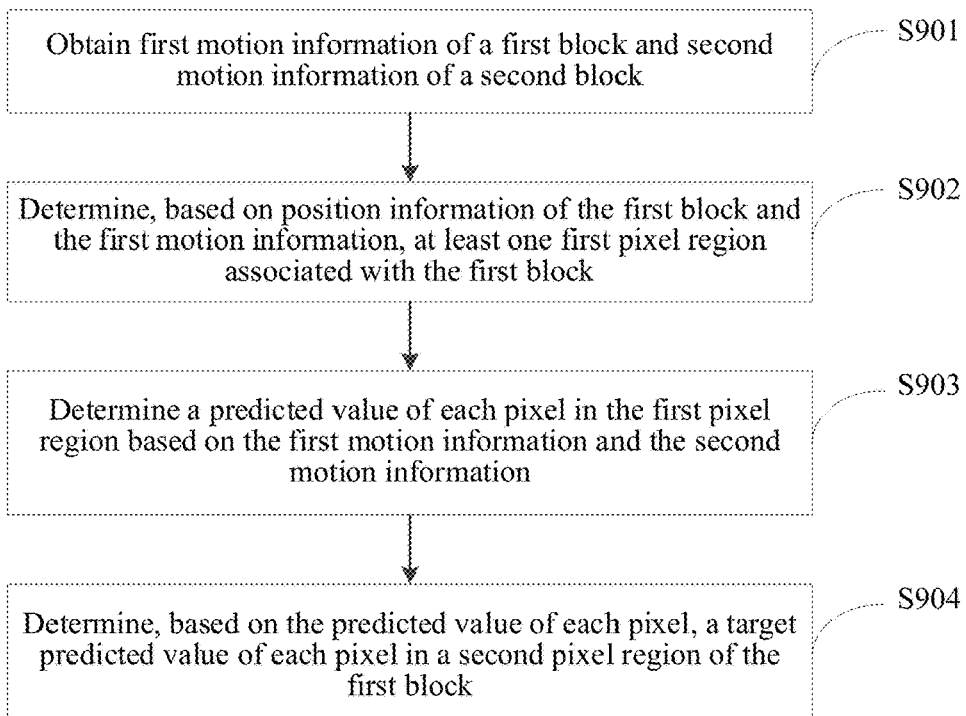
FIG. 9 is a flowchart of another inter prediction method according to an embodiment of this application.

To resolve the foregoing possible technical problem, the embodiments of this application provide an inter prediction method. Refer to FIG. 9. FIG. 9 is a flowchart of another inter prediction method provided in this application. The another inter prediction method provided in this embodiment includes the following steps.

S901: Obtain first motion information of a first block and second motion information of a second block.

S902: Determine, based on position information of the first block and the first motion information, at least one first pixel region associated with the first block.

S903: Determine a predicted value of each pixel in the first pixel region based on the first motion information and the second motion information.

S904: Determine, based on the predicted value of each pixel, a target predicted value of each pixel in a second pixel region of the first block.

Figure 10:
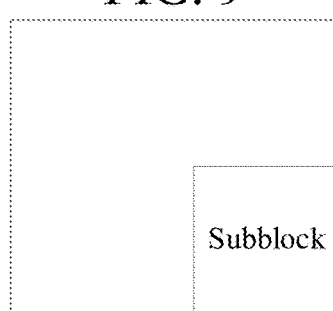
FIG. 10 is a first schematic diagram of an application scenario of another inter prediction method according to an embodiment of this application.
Figure 11:
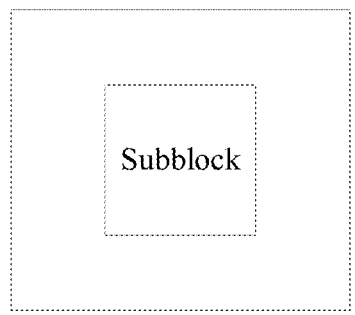
FIG. 11 is a second schematic diagram of an application scenario of another inter prediction method according to an embodiment of this application.

It should be understood that, in other embodiments, the inter prediction method provided in this embodiment of this application may alternatively be used to generate a predicted value of a boundary pixel of each subblock in an encoded block or a decoded block. In this implementation, refer to FIG. 10. A subblock shown in FIG. 10 may be understood as the first block in this embodiment, and the subblock is located at the lower right of an encoded block or a decoded block. Refer to FIG. 11. A subblock shown in FIG. 11 may be understood as the first block in this embodiment, and the subblock is located in the middle of an encoded block or a decoded block.

In this embodiment of this application, the first motion information of the first block and the second motion information of the second block are obtained; the at least one first pixel region associated with the first block is determined based on the position information of the first block and the first motion information; the predicted value of each pixel in the first pixel region is determined based on the first motion information and the second motion information; and the target predicted value of each pixel in the second pixel region of the first block is determined based on the predicted value of each pixel. In this embodiment of this application, the predicted value of each pixel in the first pixel region is determined based on the first motion information and the second motion information. In this way, a motion difference between the first block and the second block is fully considered during refinement of a predicted value of a boundary pixel, to improve accuracy of a refined predicted value of the boundary pixel and therefore improve efficiency of video encoding and decoding.

Optionally, the first pixel region includes a first pixel sub-region, and the first pixel sub-region is a partial pixel region of the first block, or the first pixel sub-region is a partial pixel region of the second block, or the first pixel sub-region is a region including a partial pixel region of the first block and a partial pixel region of the second block; and the determining a predicted value of each pixel in the first pixel region based on the first motion information and the second motion information includes:

for any first pixel in the first pixel sub-region, determining a reconstructed value of a first reference pixel that is in a first reference frame and that corresponds to the first pixel as a first predicted value of the first pixel; and determining a reconstructed value of a second reference pixel that is in a second reference frame and that corresponds to the first pixel as a second predicted value of the first pixel, where the first reference frame is determined based on the first motion information, and the second reference frame is determined based on the second motion information.

Optionally, the determining, based on the predicted value of each pixel, a target predicted value of each pixel in a second pixel region of the first block includes:

calculating a first difference between a first predicted value and a second predicted value that correspond to each first pixel in the first pixel sub-region; and in a case that the first difference is greater than a first preset threshold, determining the target predicted value of each pixel in the second pixel region based on position information of each pixel in the second pixel region and the first motion information; or in a case that the first difference is less than or equal to the first preset threshold, performing weighted summation on a third predicted value and a fourth predicted value of each pixel in the second pixel region based on a preset first weight value combination to obtain the target predicted value of each pixel in the second pixel region, where the first weight value combination includes at least one weight group, the weight group includes a first weight value and a second weight value, the first weight value corresponds to the third predicted value, the second weight value corresponds to the fourth predicted value, the third predicted value is determined based on the first motion information, and the fourth predicted value is determined based on the second motion information.

Optionally, the first pixel region includes a second pixel sub-region and a third pixel sub-region, the second pixel sub-region is a partial pixel region of the first block, and the third pixel sub-region is a partial pixel region of the second block; and the determining a predicted value of each pixel in the first pixel region based on the first motion information and the second motion information includes:

for any second pixel in the second pixel sub-region, determining a reconstructed value of a third reference pixel that is in a third reference frame and that corresponds to the second pixel as a fifth predicted value of the second pixel;

determining a reconstructed value of a fourth reference pixel that is in a fourth reference frame and that corresponds to the second pixel as a sixth predicted value of the second pixel;

for any third pixel in the third pixel sub-region, determining a reconstructed value of a fifth reference pixel that is in a fifth reference frame and that corresponds to the third pixel as a seventh predicted value of the third pixel; and determining a reconstructed value of a sixth reference pixel that is in a sixth reference frame and that corresponds to the third pixel as an eighth predicted value of the third pixel, where the third reference frame and the fifth reference frame are determined based on the first motion information, and the fourth reference frame and the sixth reference frame are determined based on the second motion information.

Optionally, the determining, based on the predicted value of each pixel, a target predicted value of each pixel in a second pixel region of the first block includes:

determining a second difference and a third difference of each target pixel based on the fifth predicted value, the sixth predicted value, the seventh predicted value, and the eighth predicted value, where the target pixel includes a second pixel and a third pixel; and in a case that the second difference and the third difference meet a preset condition, determining the target predicted value of each pixel in the second pixel region based on position information of each pixel in the second pixel region and the first motion information; or in a case that the second difference and the third difference do not meet the preset condition, performing weighted summation on a ninth predicted value and a tenth predicted value of each pixel in the second pixel region based on a preset second weight value combination to obtain the target predicted value of each pixel in the second pixel region, where the second weight value combination includes at least one weight group, the weight group includes a third weight value and a fourth weight value, the third weight value corresponds to the ninth predicted value, the fourth weight value corresponds to the tenth predicted value, the ninth predicted value is determined based on the first motion information, and the tenth predicted value is determined based on the second motion information.

Optionally, the determining a second difference and a third difference based on the fifth predicted value, the sixth predicted value, the seventh predicted value, and the eighth predicted value includes:

determining a difference between the fifth predicted value and the sixth predicted value as the second difference, and determining a difference between the seventh predicted value and the eighth predicted value as the third difference; or determining a difference between the fifth predicted value and the seventh predicted value as the second difference, and determining a difference between the sixth predicted value and the eighth predicted value as the third difference.

The inter prediction method provided in the embodiments of this application may be performed by an inter prediction apparatus. In the embodiments of this application, an inter prediction apparatus provided in the embodiments of this application is described by using an example in which the inter prediction apparatus performs the inter prediction method.

Figure 12:
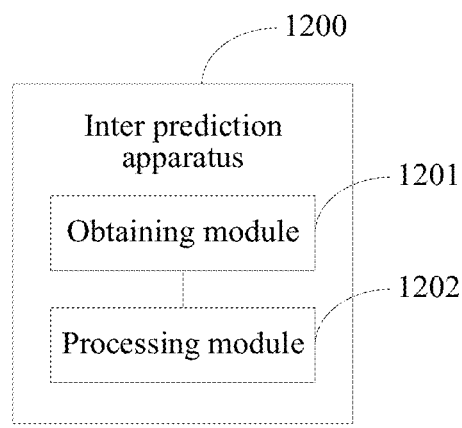
FIG. 12 is a structural diagram of an inter prediction apparatus according to an embodiment of this application.

As shown in FIG. 12, an inter prediction apparatus 1200 includes:

an obtaining module 1201, configured to obtain target information; and a processing module 1202, configured to perform inter prediction on each first block based on the target information.

Optionally, the processing module 1202 is specifically configured to:

in a case that the predicted value derivation mode corresponding to the target picture frame is a first derivation mode, determine that the predicted value derivation mode corresponding to each first block in the target picture frame is the first derivation mode, and performing inter prediction on each first block by using the first derivation mode;

in a case that the predicted value derivation mode corresponding to the target picture frame is a second derivation mode, determine that the predicted value derivation mode for each first block in the target picture frame is the second derivation mode, and performing inter prediction on each first block by using the second derivation mode; and in a case that the predicted value derivation mode corresponding to the target picture frame is a third derivation mode, determine that the predicted value derivation mode for each first block in the target picture frame is the third derivation mode, and performing inter prediction on each first block by using the third derivation mode.

Optionally, the processing module 1202 is further specifically configured to:

in a case that a predicted value derivation mode corresponding to any first block is a first derivation mode, perform inter prediction on the first block by using the first derivation mode;

in a case that a predicted value derivation mode corresponding to any first block is a second derivation mode, perform inter prediction on the first block by using the second derivation mode; and in a case that a predicted value derivation mode corresponding to any first block is a third derivation mode, perform inter prediction on the first block by using the third derivation mode.

Optionally, the processing module 1202 is further specifically configured to:

in a case that the predicted value derivation mode corresponding to the target picture frame is a third derivation mode, perform inter prediction on each first block by using the third derivation mode; or in a case that the predicted value derivation mode corresponding to the target picture frame is not a third derivation mode, determine, based on a predicted value derivation mode corresponding to each first block in the target picture frame, the predicted value derivation mode corresponding to each first block, and perform inter prediction on each first block.

Optionally, the processing module 1202 is specifically configured to:

obtain first motion information of the first block and second motion information of a second block;

determine, based on position information of the first block and the first motion information, at least one first pixel region associated with the first block;

determine a predicted value of each pixel in the first pixel region based on the first motion information and the second motion information; and determine, based on the predicted value of each pixel, a target predicted value of each pixel in a second pixel region of the first block.

Optionally, the processing module 1202 is further specifically configured to:

for any first pixel in a first pixel sub-region, determine a reconstructed value of a first reference pixel that is in a first reference frame and that corresponds to the first pixel as a first predicted value of the first pixel; and determine a reconstructed value of a second reference pixel that is in a second reference frame and that corresponds to the first pixel as a second predicted value of the first pixel.

Optionally, the processing module 1202 is further specifically configured to:

calculate a first difference between a first predicted value and a second predicted value that correspond to each first pixel in the first pixel sub-region; and in a case that the first difference is greater than a first preset threshold, determine the target predicted value of each pixel in the second pixel region based on position information of each pixel in the second pixel region and the first motion information; or in a case that the first difference is less than or equal to the first preset threshold, perform weighted summation on a third predicted value and a fourth predicted value of each pixel in the second pixel region based on a preset first weight value combination to obtain the target predicted value of each pixel in the second pixel region.

Optionally, the processing module 1202 is further specifically configured to:

for any second pixel in a second pixel sub-region, determine a reconstructed value of a third reference pixel that is in a third reference frame and that corresponds to the second pixel as a fifth predicted value of the second pixel;

determine a reconstructed value of a fourth reference pixel that is in a fourth reference frame and that corresponds to the second pixel as a sixth predicted value of the second pixel;

for any third pixel in a third pixel sub-region, determine a reconstructed value of a fifth reference pixel that is in a fifth reference frame and that corresponds to the third pixel as a seventh predicted value of the third pixel; and determine a reconstructed value of a sixth reference pixel that is in a sixth reference frame and that corresponds to the third pixel as an eighth predicted value of the third pixel.

Optionally, the processing module 1202 is further specifically configured to:

determine a second difference and a third difference of each target pixel based on the fifth predicted value, the sixth predicted value, the seventh predicted value, and the eighth predicted value; and in a case that the second difference and the third difference meet a preset condition, determine the target predicted value of each pixel in the second pixel region based on position information of each pixel in the second pixel region and the first motion information; or in a case that the second difference and the third difference do not meet the preset condition, perform weighted summation on a ninth predicted value and a tenth predicted value of each pixel in the second pixel region based on a preset second weight value combination to obtain the target predicted value of each pixel in the second pixel region.

Optionally, the processing module 1202 is further specifically configured to:

determine a difference between the fifth predicted value and the sixth predicted value as the second difference, and determine a difference between the seventh predicted value and the eighth predicted value as the third difference; or determine a difference between the fifth predicted value and the seventh predicted value as the second difference, and determine a difference between the sixth predicted value and the eighth predicted value as the third difference.

In this embodiment of this application, target information is obtained, where the target information includes a predicted value derivation mode corresponding to a target picture frame and/or a predicted value derivation mode corresponding to each first block in the target picture frame; and inter prediction is performed on each first block based on the target information. To be specific, for any first block in a target picture frame, inter prediction is performed on the first block by using a corresponding predicted value derivation mode, to improve accuracy of a predicted value obtained through inter prediction on a block, and therefore improve efficiency of video encoding and decoding.

The inter prediction apparatus provided in this embodiment of this application is capable of implementing the processes implemented in the method embodiment of FIG. 1, with the same technical effect achieved. To avoid repetition, details are not described herein again.

The embodiments of this application further provide an inter prediction method that may be performed by an inter prediction apparatus. In the embodiments of this application, an inter prediction apparatus provided in the embodiments of this application is described by using an example in which the inter prediction apparatus performs the inter prediction method.

Figure 13:
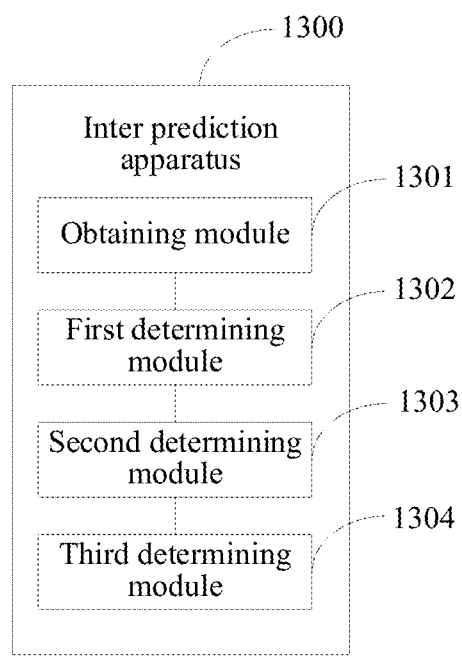
FIG. 13 is a structural diagram of another inter prediction apparatus according to an embodiment of this application.

As shown in FIG. 13, an inter prediction apparatus 1300 includes:

an obtaining module 1301, configured to obtain first motion information of a first block and second motion information of a second block;

a first determining module 1302, configured to determine, based on position information of the first block and the first motion information, at least one first pixel region associated with the first block;

a second determining module 1303, configured to determine a predicted value of each pixel in the first pixel region based on the first motion information and the second motion information; and a third determining module 1304, configured to determine, based on the predicted value of each pixel, a target predicted value of each pixel in a second pixel region of the first block.

Optionally, the second determining module 1303 is specifically configured to:

for any first pixel in a first pixel sub-region, determine a reconstructed value of a first reference pixel that is in a first reference frame and that corresponds to the first pixel as a first predicted value of the first pixel; and determine a reconstructed value of a second reference pixel that is in a second reference frame and that corresponds to the first pixel as a second predicted value of the first pixel.

Optionally, the third determining module 1304 is specifically configured to:

calculate a first difference between a first predicted value and a second predicted value that correspond to each first pixel in the first pixel sub-region; and in a case that the first difference is greater than a first preset threshold, determine the target predicted value of each pixel in the second pixel region based on position information of each pixel in the second pixel region and the first motion information; or in a case that the first difference is less than or equal to the first preset threshold, perform weighted summation on a third predicted value and a fourth predicted value of each pixel in the second pixel region based on a preset first weight value combination to obtain the target predicted value of each pixel in the second pixel region.

Optionally, the second determining module 1303 is further specifically configured to:

for any second pixel in a second pixel sub-region, determine a reconstructed value of a third reference pixel that is in a third reference frame and that corresponds to the second pixel as a fifth predicted value of the second pixel;

determine a reconstructed value of a fourth reference pixel that is in a fourth reference frame and that corresponds to the second pixel as a sixth predicted value of the second pixel;

for any third pixel in a third pixel sub-region, determine a reconstructed value of a fifth reference pixel that is in a fifth reference frame and that corresponds to the third pixel as a seventh predicted value of the third pixel; and determine a reconstructed value of a sixth reference pixel that is in a sixth reference frame and that corresponds to the third pixel as an eighth predicted value of the third pixel.

Optionally, the third determining module 1304 is further specifically configured to:

determine a second difference and a third difference of each target pixel based on the fifth predicted value, the sixth predicted value, the seventh predicted value, and the eighth predicted value; and in a case that the second difference and the third difference meet a preset condition, determine the target predicted value of each pixel in the second pixel region based on position information of each pixel in the second pixel region and the first motion information; or in a case that the second difference and the third difference do not meet the preset condition, perform weighted summation on a ninth predicted value and a tenth predicted value of each pixel in the second pixel region based on a preset second weight value combination to obtain the target predicted value of each pixel in the second pixel region.

Optionally, the third determining module 1304 is further specifically configured to:

determine a difference between the fifth predicted value and the sixth predicted value as the second difference, and determine a difference between the seventh predicted value and the eighth predicted value as the third difference; or determine a difference between the fifth predicted value and the seventh predicted value as the second difference, and determine a difference between the sixth predicted value and the eighth predicted value as the third difference.

In this embodiment of this application, the first motion information of the first block and the second motion information of the second block are obtained; the at least one first pixel region associated with the first block is determined based on the position information of the first block and the first motion information; the predicted value of each pixel in the first pixel region is determined based on the first motion information and the second motion information; and the target predicted value of each pixel in the second pixel region of the first block is determined based on the predicted value of each pixel. In this embodiment of this application, the predicted value of each pixel in the first pixel region is determined based on the first motion information and the second motion information. In this way, a motion difference between the first block and the second block is fully considered during refinement of a predicted value of a boundary pixel, to improve accuracy of a refined predicted value of the boundary pixel and therefore improve efficiency of video encoding and decoding.

The inter prediction apparatus provided in this embodiment of this application is capable of implementing the processes implemented in the method embodiment of FIG. 7, with the same technical effect achieved. To avoid repetition, details are not described herein again.

The inter prediction apparatus in the embodiments of this application may be an electronic device, for example, an electronic device with an operating system; or may be a component in an electronic device, for example, an integrated circuit or a chip. The electronic device may be a terminal or another device other than the terminal. For example, the terminal may include but is not limited to the aforementioned types of terminals, and the another device may be a server, a network attached storage (Network Attached Storage, NAS), or the like. This is not specifically limited in the embodiments of this application.

Figure 14:
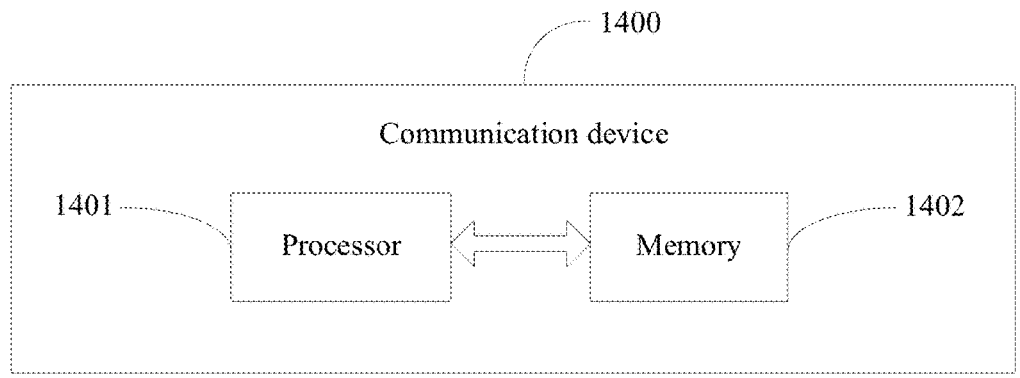
FIG. 14 is a structural diagram of a communication device according to embodiment of this application.

Optionally, as shown in FIG. 14, an embodiment of this application further provides a communication device 1400, including a processor 1401 and a memory 1402. The memory 1402 stores a program or instructions capable of running on the processor 1401. For example, in a case that the communication device 1400 is a terminal, when the program or instructions are executed by the processor 1401, the steps in the foregoing embodiments of the inter prediction method are implemented, with the same technical effect achieved.

An embodiment of this application further provides a terminal, including a processor and a communication interface. The processor is configured to perform the following operations:

obtaining target information; and performing inter prediction on each first block based on the target information.

Alternatively, the processor is configured to perform the following operations:

obtaining first motion information of a first block and second motion information of a second block;

determining, based on position information of the first block and the first motion information, at least one first pixel region associated with the first block;

determining a predicted value of each pixel in the first pixel region based on the first motion information and the second motion information; and determining, based on the predicted value of each pixel, a target predicted value of each pixel in a second pixel region of the first block.

Figure 15:
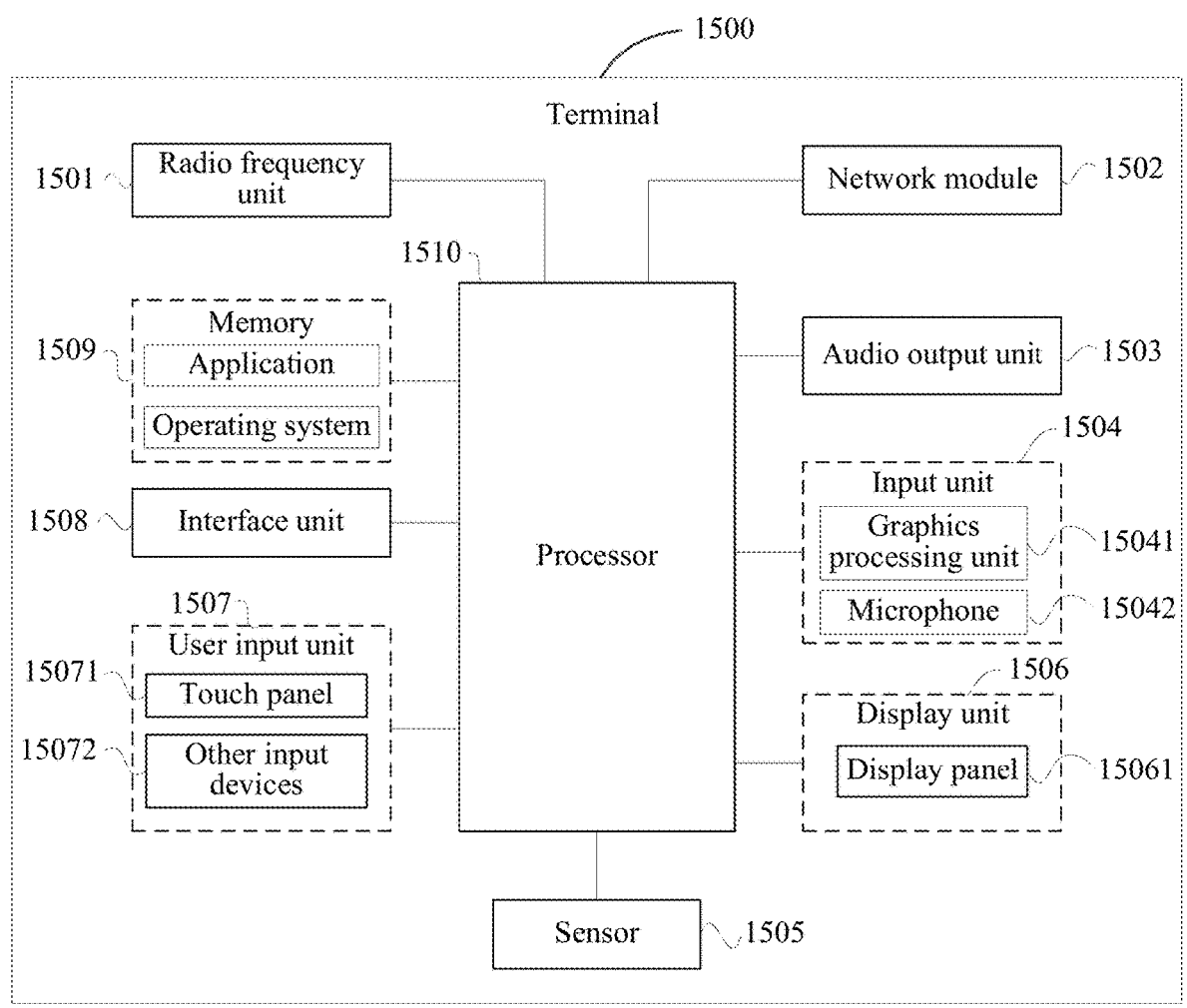
FIG. 15 is a schematic diagram of a hardware structure of a terminal according to an embodiment of this application.

The terminal embodiment corresponds to the foregoing terminal-side method embodiment, and all implementation processes and implementations of the foregoing method embodiment are applicable to the terminal embodiment, with the same technical effect achieved. Specifically, FIG. 15 is a schematic diagram of a hardware structure of a terminal for implementing embodiments of this application.

The terminal 1500 includes but is not limited to components such as a radio frequency unit 1501, a network module 1502, an audio output unit 1503, an input unit 1504, a sensor 1505, a display unit 1506, a user input unit 1507, an interface unit 1508, a memory 1509, and a processor 1510.

A person skilled in the art can understand that the terminal 1500 may further include a power supply (for example, a battery) that supplies power to each component. The power supply may be logically connected to the processor 1510 by using a power management system, to implement functions such as charging management, discharging management, and power consumption management by using the power management system. The terminal structure shown in FIG. 15 does not constitute a limitation on the terminal. The terminal may include more or fewer components than those shown in the figure, or some components may be combined, or there may be a different component layout. Details are not described herein again.

It should be understood that, in this embodiment of this application, the input unit 1504 may include a graphics processing unit (Graphics Processing Unit, GPU) 15041 and a microphone 15042. The graphics processing unit 15041 processes image data of a static picture or a video that is obtained by an image capture apparatus (for example, a camera) in a video capture mode or an image capture mode. The display unit 1506 may include a display panel 15061. The display panel 15061 may be configured in a form of a liquid crystal display, an organic light-emitting diode, or the like. The user input unit 1507 includes at least one of a touch panel 15071 and other input devices 15072. The touch panel 15071 is also referred to as a touchscreen. The touch panel 15071 may include two parts: a touch detection apparatus and a touch controller. The other input devices 15072 may include but are not limited to a physical keyboard, a function key (such as a volume control key or an on/off key), a trackball, a mouse, and a joystick. Details are not described herein.

In this embodiment of this application, after receiving downlink data from a network-side device, the radio frequency unit 1501 may transmit the downlink data to the processor 1510 for processing. The radio frequency unit 1501 may transmit uplink data to the network-side device. Usually, the radio frequency unit 1501 includes but is not limited to an antenna, an amplifier, a transceiver, a coupler, a low noise amplifier, a duplexer, and the like.

The memory 1509 may be configured to store software programs or instructions and various data. The memory 1509 may mainly include a first storage region for storing a program or instructions and a second storage region for storing data. The first storage region may store an operating system, an application or instructions required by at least one function (for example, an audio play function or an image play function), and the like. In addition, the memory 1509 may include a volatile memory or a non-volatile memory, or the memory 1509 may include both a volatile memory and a non-volatile memory. The non-volatile memory may be a read-only memory (Read-Only Memory, ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (Random Access Memory, RAM), a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDRSDRAM), an enhanced synchronous dynamic random access memory (Enhanced SDRAM, ESDRAM), a synchlink dynamic random access memory (Synchlink DRAM, SLDRAM), or a direct rambus random access memory (Direct Rambus RAM, DRRAM). The memory 1509 in this embodiment of this application includes but is not limited to these and any other suitable types of memories.

The processor 1510 may include one or more processing units. Optionally, the processor 1510 integrates an application processor and a modem processor. The application processor mainly processes operations related to an operating system, a user interface, an application, and the like. The modem processor mainly processes wireless communication signals, for example, is a baseband processor. It can be understood that the modem processor may alternatively not be integrated in the processor 1510.

The processor 1510 is configured to perform the following operations:

obtaining target information; and performing inter prediction on each first block based on the target information.

Alternatively, the processor 1510 is configured to perform the following operations:

obtaining first motion information of a first block and second motion information of a second block;

determining, based on position information of the first block and the first motion information, at least one first pixel region associated with the first block;

determining a predicted value of each pixel in the first pixel region based on the first motion information and the second motion information; and determining, based on the predicted value of each pixel, a target predicted value of each pixel in a second pixel region of the first block.

An embodiment of this application further provides a readable storage medium. The readable storage medium stores a program or instructions. When the program or instructions are executed by a processor, the processes in the foregoing embodiments of the inter prediction method are implemented, with the same technical effect achieved. To avoid repetition, details are not described herein again.

The processor is a processor in the terminal in the foregoing embodiments. The readable storage medium includes a computer-readable storage medium, for example, a computer read-only memory ROM, a random access memory RAM, a magnetic disk, or an optical disc.

An embodiment of this application further provides a chip. The chip includes a processor and a communication interface. The communication interface is coupled to the processor. The processor is configured to run a program or instructions, to implement the processes in the foregoing embodiments of the inter prediction method, with the same technical effect achieved. To avoid repetition, details are not described herein again.

It should be understood that the chip provided in this embodiment of this application may also be referred to as a system-level chip, a system on chip, a chip system, a system-on-a-chip, or the like.

An embodiment of this application further provides a computer program or program product. The computer program or program product is stored in a storage medium. The computer program or program product is executed by at least one processor to implement the processes in the foregoing embodiments of the inter prediction method, with the same technical effect achieved. To avoid repetition, details are not described herein again.

It should be noted that the terms "include", "comprise", or any other variation thereof in this specification are intended to cover a non-exclusive inclusion, so that a process, a method, an object, or an apparatus that includes a list of elements not only includes those elements but also includes other elements that are not expressly listed, or further includes elements inherent to such a process, method, object, or apparatus. In absence of more constraints, an element preceded by "includes a . . . " does not preclude the existence of other identical elements in the process, method, article, or apparatus that includes the element. In addition, it should be noted that the scope of the method and apparatus in the implementations of this application is not limited to performing functions in the shown or described order, but may also include performing functions in a substantially simultaneous manner or in a reverse order depending on the functions involved. For example, the described method may be performed in an order different from that described, and steps may be added, omitted, or combined. In addition, features described with reference to some examples may be combined in other examples.

According to the foregoing descriptions of the implementations, a person skilled in the art can clearly understand that the methods in the foregoing embodiments may be implemented by using software in combination with a necessary common hardware platform, or certainly may be implemented by using hardware. However, in most cases, the former is a preferred implementation. Based on such an understanding, the technical solutions of this application essentially or the part contributing to the conventional technology may be implemented in a form of a computer software product. The computer software product may be stored in a storage medium (for example, a ROM/RAM, a magnetic disk, or a compact disc), and includes several instructions for instructing a terminal (which may be a mobile phone, a computer, a server, an air conditioner, a network device, or the like) to perform the methods in the embodiments of this application.

The foregoing describes the embodiments of this application with reference to the accompanying drawings. However, this application is not limited to the foregoing specific implementations. The foregoing specific implementations are merely examples, but are not limitative. Inspired by this application, a person of ordinary skill in the art may further make many modifications without departing from the purposes of this application and the protection scope of the claims, and all the modifications shall fall within the protection scope of this application.

What is claimed is:

1. An inter prediction method, comprising:
obtaining target information, wherein the target information comprises a predicted value derivation mode corresponding to a target picture frame and/or a predicted value derivation mode corresponding to each first block in the target picture frame; and
performing inter prediction on each first block based on the target information, wherein
the target picture frame is a to-be-encoded picture frame, and the first block is a to-be-encoded block; or the target picture frame is a to-be-decoded picture frame, and the first block is a to-be-decoded block.

2. The method according to claim 1, wherein the target information comprises the predicted value derivation mode corresponding to the target picture frame; and
the performing inter prediction on each first block in the target picture frame based on the target information comprises at least one of the following:
in a case that the predicted value derivation mode corresponding to the target picture frame is a first derivation mode, determining that the predicted value derivation mode corresponding to each first block in the target picture frame is the first derivation mode, and performing inter prediction on each first block by using the first derivation mode, wherein the first derivation mode is a predicted value derivation mode determined based on motion information corresponding to each first block, position information corresponding to each first block, and motion information corresponding to an adjacent block of each first block;
in a case that the predicted value derivation mode corresponding to the target picture frame is a second derivation mode, determining that the predicted value derivation mode for each first block in the target picture frame is the second derivation mode, and performing inter prediction on each first block by using the second derivation mode, wherein the second derivation mode is a predicted value derivation mode determined based on motion information corresponding to each first block, a preset pixel region corresponding to each first block, and motion information corresponding to an adjacent block of each first block; and
in a case that the predicted value derivation mode corresponding to the target picture frame is a third derivation mode, determining that the predicted value derivation mode for each first block in the target picture frame is the third derivation mode, and performing inter prediction on each first block by using the third derivation mode, wherein the third derivation mode is a predicted value derivation mode determined based on motion information corresponding to each first block.

3. The method according to claim 1, wherein the target information comprises the predicted value derivation mode corresponding to each first block in the target picture frame; and the performing inter prediction on each first block in the target picture frame based on the target information comprises at least one of the following:
in a case that a predicted value derivation mode corresponding to any first block is a first derivation mode, performing inter prediction on the first block by using the first derivation mode;
in a case that a predicted value derivation mode corresponding to any first block is a second derivation mode, performing inter prediction on the first block by using the second derivation mode; and
in a case that a predicted value derivation mode corresponding to any first block is a third derivation mode, performing inter prediction on the first block by using the third derivation mode.

4. The method according to claim 1, wherein the target information comprises the predicted value derivation mode corresponding to the target picture frame and the predicted value derivation mode corresponding to each first block in the target picture frame; and
the performing inter prediction on each first block in the target picture frame based on the target information comprises:
in a case that the predicted value derivation mode corresponding to the target picture frame is a third derivation mode, performing inter prediction on each first block by using the third derivation mode; or
in a case that the predicted value derivation mode corresponding to the target picture frame is not a third derivation mode, performing inter prediction on each first block based on the predicted value derivation mode corresponding to each first block in the target picture frame.

5. The method according to claim 1, wherein in a case that the predicted value derivation mode corresponding to each first block in the target picture frame is a first derivation mode, the performing inter prediction on each first block based on the target information comprises:
obtaining first motion information of the first block and second motion information of a second block, wherein the first block is adjacent to the second block;
determining, based on position information of the first block and the first motion information, at least one first pixel region associated with the first block;
determining a predicted value of each pixel in the first pixel region based on the first motion information and the second motion information; and
determining, based on the predicted value of each pixel, a target predicted value of each pixel in a second pixel region of the first block, wherein
the first block is a to-be-encoded block, and the second block is an encoded block; or the first block is a to-be-decoded block, and the second block is a decoded block.

6. The method according to claim 5, wherein the first pixel region comprises a first pixel sub-region, and the first pixel sub-region is a partial pixel region of the first block, or the first pixel sub-region is a partial pixel region of the second block, or the first pixel sub-region is a region comprising a partial pixel region of the first block and a partial pixel region of the second block; and
the determining a predicted value of each pixel in the first pixel region based on the first motion information and the second motion information comprises:
for any first pixel in the first pixel sub-region, determining a reconstructed value of a first reference pixel that is in a first reference frame and that corresponds to the first pixel as a first predicted value of the first pixel; and
determining a reconstructed value of a second reference pixel that is in a second reference frame and that corresponds to the first pixel as a second predicted value of the first pixel, wherein
the first reference frame is determined based on the first motion information, and the second reference frame is determined based on the second motion information.

7. The method according to claim 6, wherein the determining, based on the predicted value of each pixel, a target predicted value of each pixel in a second pixel region of the first block comprises:
calculating a first difference between a first predicted value and a second predicted value that correspond to each first pixel in the first pixel sub-region; and
in a case that the first difference is greater than a first preset threshold, determining the target predicted value of each pixel in the second pixel region based on position information of each pixel in the second pixel region and the first motion information; or
in a case that the first difference is less than or equal to the first preset threshold, performing weighted summation on a third predicted value and a fourth predicted value of each pixel in the second pixel region based on a preset first weight value combination to obtain the target predicted value of each pixel in the second pixel region, wherein
the first weight value combination comprises at least one weight group, the weight group comprises a first weight value and a second weight value, the first weight value corresponds to the third predicted value, the second weight value corresponds to the fourth predicted value, the third predicted value is determined based on the first motion information, and the fourth predicted value is determined based on the second motion information.

8. The method according to claim 5, wherein the first pixel region comprises a second pixel sub-region and a third pixel sub-region, the second pixel sub-region is a partial pixel region of the first block, and the third pixel sub-region is a partial pixel region of the second block; and
the determining a predicted value of each pixel in the first pixel region based on the first motion information and the second motion information comprises:
for any second pixel in the second pixel sub-region, determining a reconstructed value of a third reference pixel that is in a third reference frame and that corresponds to the second pixel as a fifth predicted value of the second pixel;
determining a reconstructed value of a fourth reference pixel that is in a fourth reference frame and that corresponds to the second pixel as a sixth predicted value of the second pixel;
for any third pixel in the third pixel sub-region, determining a reconstructed value of a fifth reference pixel that is in a fifth reference frame and that corresponds to the third pixel as a seventh predicted value of the third pixel; and
determining a reconstructed value of a sixth reference pixel that is in a sixth reference frame and that corresponds to the third pixel as an eighth predicted value of the third pixel, wherein
the third reference frame and the fifth reference frame are determined based on the first motion information, and the fourth reference frame and the sixth reference frame are determined based on the second motion information.

9. The method according to claim 8, wherein the determining, based on the predicted value of each pixel, a target predicted value of each pixel in a second pixel region of the first block comprises:
- determining a second difference and a third difference of each target pixel based on the fifth predicted value, the sixth predicted value, the seventh predicted value, and the eighth predicted value, wherein the target pixel comprises a second pixel and a third pixel; and
- in a case that the second difference and the third difference meet a preset condition, determining the target predicted value of each pixel in the second pixel region based on position information of each pixel in the second pixel region and the first motion information; or
- in a case that the second difference and the third difference do not meet the preset condition, performing weighted summation on a ninth predicted value and a tenth predicted value of each pixel in the second pixel region based on a preset second weight value combination to obtain the target predicted value of each pixel in the second pixel region, wherein
- the second weight value combination comprises at least one weight group, the weight group comprises a third weight value and a fourth weight value, the third weight value corresponds to the ninth predicted value, the fourth weight value corresponds to the tenth predicted value, the ninth predicted value is determined based on the first motion information, and the tenth predicted value is determined based on the second motion information.

10. The method according to claim 5, wherein the first pixel region meets at least one of the following:
- the first pixel region is an encoded or decoded pixel region that comprises M1 rows and N1 columns of pixels adjacent to a top edge of the first block;
- the first pixel region is an encoded or decoded pixel region that comprises M2 rows and N2 columns of pixels adjacent to a left edge of the first block;
- the first pixel region is an unencoded or undecoded pixel region that comprises M3 rows and N3 columns of pixels located at the top in the first block;
- the first pixel region is an unencoded or undecoded pixel region that comprises M4 rows and N4 columns of pixels located on the left in the first block;
- the first pixel region is an M5-row N5-column pixel region that comprises an encoded or decoded pixel region adjacent to a top edge of the first block and an unencoded or undecoded pixel region at the top in the first block; and
- the first pixel region is an M6-row N6-column pixel region that comprises an encoded or decoded pixel region adjacent to a left edge of the first block and an unencoded or undecoded pixel region on the left in the first block, wherein
M1, M2, M3, M4, M5, M6, N1, N2, N3, N4, N5, and N6 are all positive integers.

11. An inter prediction method, comprising:
- obtaining first motion information of a first block and second motion information of a second block, wherein the first block is adjacent to the second block;
- determining, based on position information of the first block and the first motion information, at least one first pixel region associated with the first block;
- determining a predicted value of each pixel in the first pixel region based on the first motion information and the second motion information; and
- determining, based on the predicted value of each pixel, a target predicted value of each pixel in a second pixel region of the first block, wherein
- the first block is a to-be-encoded block, and the second block is an encoded block; or the first block is a to-be-decoded block, and the second block is a decoded block.

12. The method according to claim 11, wherein the first pixel region comprises a first pixel sub-region, and the first pixel sub-region is a partial pixel region of the first block, or the first pixel sub-region is a partial pixel region of the second block, or the first pixel sub-region is a region comprising a partial pixel region of the first block and a partial pixel region of the second block; and
- the determining a predicted value of each pixel in the first pixel region based on the first motion information and the second motion information comprises:
- for any first pixel in the first pixel sub-region, determining a reconstructed value of a first reference pixel that is in a first reference frame and that corresponds to the first pixel as a first predicted value of the first pixel; and
- determining a reconstructed value of a second reference pixel that is in a second reference frame and that corresponds to the first pixel as a second predicted value of the first pixel, wherein
- the first reference frame is determined based on the first motion information, and the second reference frame is determined based on the second motion information.

13. The method according to claim 12, wherein the determining, based on the predicted value of each pixel, a target predicted value of each pixel in a second pixel region of the first block comprises:
- calculating a first difference between a first predicted value and a second predicted value that correspond to each first pixel in the first pixel sub-region; and
- in a case that the first difference is greater than a first preset threshold, determining the target predicted value of each pixel in the second pixel region based on position information of each pixel in the second pixel region and the first motion information; or
- in a case that the first difference is less than or equal to the first preset threshold, performing weighted summation on a third predicted value and a fourth predicted value of each pixel in the second pixel region based on a preset first weight value combination to obtain the target predicted value of each pixel in the second pixel region, wherein
- the first weight value combination comprises at least one weight group, the weight group comprises a first weight value and a second weight value, the first weight value corresponds to the third predicted value, the second weight value corresponds to the fourth predicted value, the third predicted value is determined based on the first motion information, and the fourth predicted value is determined based on the second motion information.

14. The method according to claim 11, wherein the first pixel region comprises a second pixel sub-region and a third pixel sub-region, the second pixel sub-region is a partial pixel region of the first block, and the third pixel sub-region is a partial pixel region of the second block; and
- the determining a predicted value of each pixel in the first pixel region based on the first motion information and the second motion information comprises:
- for any second pixel in the second pixel sub-region, determining a reconstructed value of a third reference pixel that is in a third reference frame and that corresponds to the second pixel as a fifth predicted value of the second pixel;

determining a reconstructed value of a fourth reference pixel that is in a fourth reference frame and that corresponds to the second pixel as a sixth predicted value of the second pixel;

for any third pixel in the third pixel sub-region, determining a reconstructed value of a fifth reference pixel that is in a fifth reference frame and that corresponds to the third pixel as a seventh predicted value of the third pixel; and determining a reconstructed value of a sixth reference pixel that is in a sixth reference frame and that corresponds to the third pixel as an eighth predicted value of the third pixel, wherein the third reference frame and the fifth reference frame are determined based on the first motion information, and the fourth reference frame and the sixth reference frame are determined based on the second motion information.

15. The method according to claim 14, wherein the determining, based on the predicted value of each pixel, a target predicted value of each pixel in a second pixel region of the first block comprises:

determining a second difference and a third difference of each target pixel based on the fifth predicted value, the sixth predicted value, the seventh predicted value, and the eighth predicted value, wherein the target pixel comprises a second pixel and a third pixel; and in a case that the second difference and the third difference meet a preset condition, determining the target predicted value of each pixel in the second pixel region based on position information of each pixel in the second pixel region and the first motion information; or in a case that the second difference and the third difference do not meet the preset condition, performing weighted summation on a ninth predicted value and a tenth predicted value of each pixel in the second pixel region based on a preset second weight value combination to obtain the target predicted value of each pixel in the second pixel region, wherein the second weight value combination comprises at least one weight group, the weight group comprises a third weight value and a fourth weight value, the third weight value corresponds to the ninth predicted value, the fourth weight value corresponds to the tenth predicted value, the ninth predicted value is determined based on the first motion information, and the tenth predicted value is determined based on the second motion information.

16. The method according to claim 11, wherein the first pixel region meets at least one of the following:

the first pixel region is an encoded or decoded pixel region that comprises M1 rows and N1 columns of pixels adjacent to a top edge of the first block;

the first pixel region is an encoded or decoded pixel region that comprises M2 rows and N2 columns of pixels adjacent to a left edge of the first block;

the first pixel region is an unencoded or undecoded pixel region that comprises M3 rows and N3 columns of pixels located at the top in the first block;

the first pixel region is an unencoded or undecoded pixel region that comprises M4 rows and N4 columns of pixels located on the left in the first block;

the first pixel region is an M5-row N5-column pixel region that comprises an encoded or decoded pixel region adjacent to a top edge of the first block and an unencoded or undecoded pixel region at the top in the first block; and the first pixel region is an M6-row N6-column pixel region that comprises an encoded or decoded pixel region adjacent to a left edge of the first block and an unencoded or undecoded pixel region on the left in the first block, wherein M1, M2, M3, M4, M5, M6, N1, N2, N3, N4, N5, and N6 are all positive integers.

17. A terminal, comprising a processor and a memory, wherein the memory stores a program or instructions capable of running on the processor, and when the program or instructions are executed by the processor, an inter prediction method is implemented, the inter prediction method comprises:

obtaining target information, wherein the target information comprises a predicted value derivation mode corresponding to a target picture frame and/or a predicted value derivation mode corresponding to each first block in the target picture frame; and performing inter prediction on each first block based on the target information, wherein the target picture frame is a to-be-encoded picture frame, and the first block is a to-be-encoded block; or the target picture frame is a to-be-decoded picture frame, and the first block is a to-be-decoded block.

18. A terminal, comprising a processor and a memory, wherein the memory stores a program or instructions capable of running on the processor, and when the program or instructions are executed by the processor, the inter prediction method according to claim 11 is implemented.

19. A readable storage medium, wherein the readable storage medium stores a program or instructions, and when the program or instructions are executed by a processor, the inter prediction method according to claim 1 is implemented.

20. A readable storage medium, wherein the readable storage medium stores a program or instructions, and when the program or instructions are executed by a processor, the inter prediction method according to claim 11 is implemented.

* * * * *